T. D. BOTTOME.
PROCESS OF CARBURETING AIR.
APPLICATION FILED NOV. 24, 1915.
1,230,101.
Patented June 19, 1917.
2 SHEETS—SHEET 2.
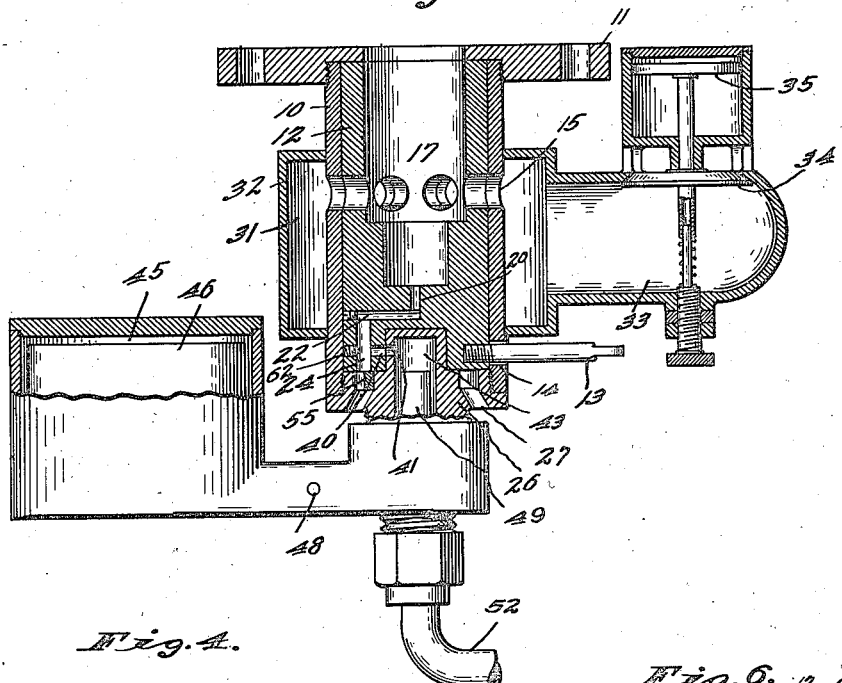
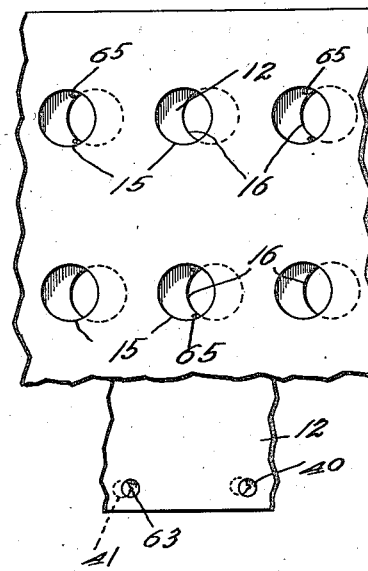
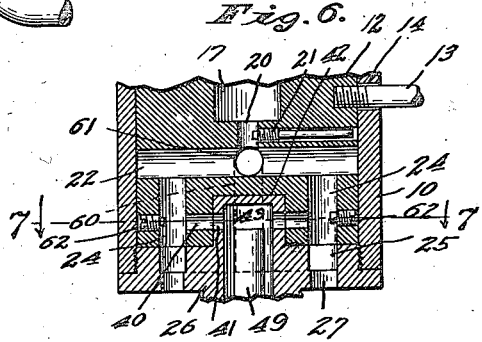
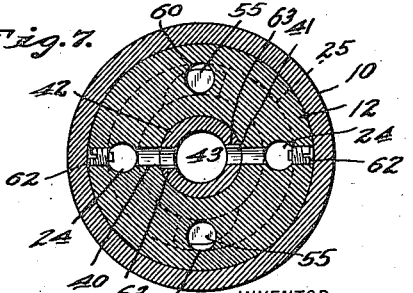
WITNESS:
Frank A. Fahle
INVENTOR
Turner D. Bottome,
BY
Hood & Ashley
ATTORNEYS,

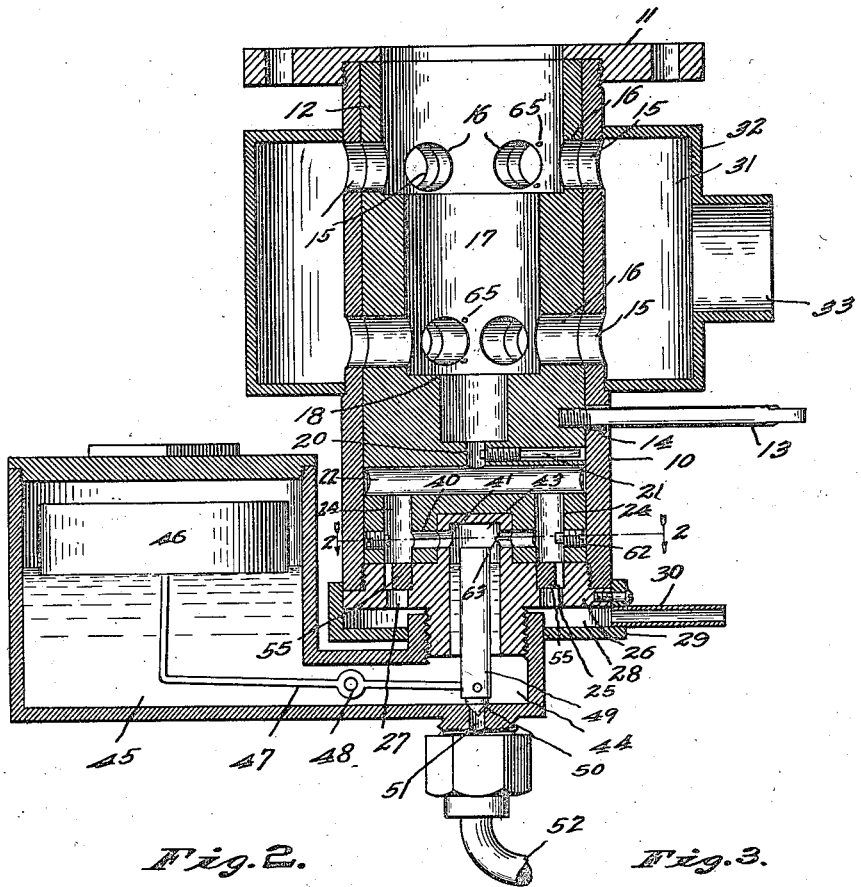

UNITED STATES PATENT OFFICE.

TURNER D. BOTTOME, OF INDIANAPOLIS, INDIANA.

PROCESS OF CARBURETING AIR.

1,230,101.     Specification of Letters Patent.     Patented June 19, 1917.

Application filed November 24, 1915. Serial No. 63,148.

*To all whom it may concern:*

Be it known that I, TURNER D. BOTTOME, a citizen of the United States, residing at Indianapolis, in the county of Marion and State of Indiana, have invented a new and useful Process of Carbureting Air, of which the following is a specification.

It is the object of my invention to produce carbureted air, especially for internal combustion engines, which shall be of uniform composition for all degrees of suction and different rates of production, and of very intimate mixture and therefore of rapid combustibility and high thermal efficiency; and to do so by very simple apparatus.

The ordinary method of carbureting air is to vary the suction on both air and fuel correspondingly, by opening and closing a throttle valve, the progressive opening of the throttle valve causing an increased vacuum or suction at both the air and the fuel inlet and consequently producing an increased flow of air and fuel in meeting an increased demand by the engine. This ordinary method has many objections, however, for the flow of fuel and the flow of air do not vary proportionately under changes in suction; and to overcome this it has been customary to provide quite complicated automatic moving apparatus for controlling the air supply to a large extent independently of the fuel. Even then, the ordinary method has never commercially succeeded in obtaining a mixture of uniform composition under the wide range of conditions encountered.

In carrying out my invention, I maintain the suction on the fuel very nearly constant, and vary the size of the fuel supply opening or openings and of the main air supply opening or openings correspondingly, maintaining the forms of the main air and fuel supply openings always of substantially the same shape as the sizes of such openings vary proportionately; and I discharge the fuel into a small stream of air which is at nearly constant vacuum and velocity at the point of discharge, and after the fuel has been discharged into this air I speed up the resultant mixed stream of air and fuel materially by sending it through a more contracted passageway and then discharge it into the main body of the air; by doing this I am able to make the fuel discharge opening of substantial size, so that the disturbing effects of capillary action are avoided, and also so that the variations in the composition of the mixture due to the inertia of the fuel flow are minimized and practically eliminated; and I discharge the mixed stream of initial air and fuel and measure the main body of air into a space in which the vacuum varies inversely as the demand for carbureted air and the supply of the main air; and I admit the main body of air by opposed and violently colliding streams of air, which produce a great turbulence at the point of collision, and discharge the mixed stream of initial air and fuel into these colliding streams of air at substantially the point of collision, so that by the turbulence of such collision the fuel is broken up into particles of exceeding fineness; and I discharge the stream of mixed initial air and fuel into the violently colliding streams of air over a shoulder in the passageway for said mixed stream, so that any fuel which may have condensed on the sides of the passageway is carried off such shoulder and into the colliding streams of air, and thereby the passage of a film of fuel along the sides of the passageway to the associated engine is prevented.

The accompanying drawings illustrate a carbureter embodying my invention. Figure 1 is a vertical sectional view through a carbureter embodying my invention; Fig. 2 is a section taken on the line 2—2 of Fig. 1; Fig. 3 is a perspective view in partial section, showing a fragment of the lower part of the carbureter shell and the upper side of the plug in the lower end of said shell, of the carbureter shown in Fig. 1; Fig. 4 is a partial development which shows the relation of the fuel and air openings and their similarity in shape for an intermediate position between full-open and full-closed position, for the carbureter shown in Fig. 1; Fig. 5 is a view similar to Fig. 1, showing a somewhat simpler form of carbureter, embodying some of the features of my invention; Fig. 6 is a fragmentary view through the lower part of a carbureter quite similar to that shown in Fig. 1, but embodying a modification of the control arrangement for the initial air which is mixed with the fuel; and Fig. 7 is a section on the line 7—7 of Fig. 6.

A stationary outer casing 10 of tubular form is conveniently screw-threaded at its top into a flange member 11 for attaching to the inlet manifold of an engine. Rotatably mounted within the stationary tubular member 10 is a hollow rotary member 12, operable by a handle 13 which projects through an arc-shaped slot 14 in the casing 10. The casing 10 is provided with a number of air inlet holes 15 and the rotatable member 12 with a corresponding number of air inlet holes 16, these holes all being radial holes and the holes 16 being movable into and out of registry with the holes 15 by the movement of the member 12. The holes 15 and 16 are arranged in one or more groups, two groups being shown in Fig. 1 and one in Fig. 5, the different groups being on different levels and the holes of the same group all being on the same level and being directed radially inward. The holes are preferably evenly spaced circumferentially, so that the converging streams of air which are thus admitted all collide violently at the center of the passageway 17 through the member 12 and there produce a violent turbulence. The ascending passageway 17 is abruptly enlarged just below each group of holes 16, or the group of holes 16 if there is but one group, so as to provide a shoulder 18 in the passageway 17 as the group or each group of holes 16 is reached. This not only serves to provide additional space for the air admitted through the holes 16, but also causes any fuel which has been admitted from the bottom into the passageway 17 (as hereinafter described) and has for any reason condensed on the sides of such passageway to be carried off the shoulder 18 into the space into which the opposing streams of air from the holes 15 and 16 are being discharged so that such fuel is struck by such air and finely atomized by the turbulence of the collison thereof, this atomizing action also taking place on the other fuel which is passing through the passageway within the member 12 but has not condensed on the sides of such passageway.

The passageway 17 in the upper part of the member 12 is supplied at the bottom through a restricted passageway 20, the size of which can be controlled by an adjusting screw 21, as shown in Fig. 1. The lower end of the passageway 20 opens into a cross passageway 22. One or more eccentric holes 24, collectively considerably larger in cross section than is the passageway 20 and parallel to the axis thereof, lead upward into the cross passage 22 and open at their lower ends into an annular groove 25 in a plug 26, most conveniently made as a separate piece from the tubular member 10 and screwed into the lower end of such tubular member 10, and whether made separate or integral being fixed in exact position relative thereto. The passageway 25 communicates freely with the atmosphere, through holes 27, which may open directly to the atmosphere but preferably communicate with a chamber 28 provided by a cap 29 fitting over the lower end of the plug 26 and having an inlet tube 30 leading to the chamber 28, for diminishing the noise of the air intake and permitting hot air from any suitable source to be supplied conveniently. Similarly, the main air inlet holes 15 may receive their supply of air from a chamber 31 formed by a jacket 32, which has an air inlet passage 33 which may receive hot air if desired from any convenient source; and if desired, though it is not necessary, the passage of air through the inlet passage 33 may be controlled by any suitable automatic valve 34 the movements of which are retarded by a dash pot 35, so that changes in the rate of air inflow will not be too abrupt.

Opening into each hole 24 is a lateral fuel passage 40, which extends from the hole 24 toward the axis of the member 12 and at its inner end coöperates with a hole 41 in a hollow, axially upwardly projecting, cylindrical extension 42 from the plug 26, such extension 42 fitting accurately within a similar recess in the bottom of the member 12. The space 43 within the extension 42 continues downwardly through the plug 26 into a fuel chamber 44, which communicates with a float chamber 45 at one side, and the float 46 in this float chamber when it descends depresses the left hand end of a lever 47 pivoted at 48 and connected to a valve 49 which extends loosely upward into the space 43 and at its lower end coöperates with a valve seat 50 at the upper end of a passageway 51 in the line of the axis of the members 10 and 12, the passageway 51 being supplied with fuel by a tube 52 from any convenient source of supply. By having the passage 51 in line with the axis of the tubes 10 and 12 and with the space 43, the fuel which passes the valve seat 50 and valve stem 49 may pass directly upward into the space 43, passing through the float chamber 45, so that the loss due to the inertia of the large body of fuel in the float chamber 45 is avoided, while at the same time the float 46 controls the fuel level in the space 43 and the supply of fuel to such space, and the fuel in the chamber 45 takes care of any fluctuations in the ratio between the fuel supply and demand.

The holes 15 and 16 are exactly similar in shape to the holes 40 and 41, these holes all conveniently being cylindrical holes. The diameters of the holes 15 and 16 bear exactly the same ratio to the diameters of the holes 40 and 41 as the ratio between the external diameter of the member 12 at the holes 15 and 16 and the external diameter of the extension 42. In the arrangement shown in Fig. 1, the diameter of the extension 42 is one-third of the diameter of the member 12, so that the diameters of the holes 40 and 41 at their coöperating ends is one-third that of the holes 15 and 16 at their coöperating ends. The plug 26 is so positioned in the lower end of the casing 10 that the holes 40 and 41 exactly register when the holes 15 and 16 exactly register. In consequence to all this, when the member 12 is moved by the lever 13, the holes 16 slip more or less out of registry with the holes 15, and the holes 40 slip more or less out of registry with the holes 41, and thus the air and fuel inlet openings are varied in exact correspondence and such air and fuel inlet openings always remain of exactly similar shape, as is clear from the partial development shown in Fig. 4. The ratio between the sizes of the main air and fuel inlet openings is thus constant, for any given carbureter, and is determined by the relative diameters of the member 12 and extension 42 and the relative number of the holes 15 and 16, and 40 and 41.

In operation, the suction produced by the associated engine maintains a partial vacuum within the passage 17. This partial vacuum causes air to be drawn in through the holes 15 and 16 when such holes register in part or in whole. It also causes air to be drawn in through the holes 27 and the annular passage 25 into the holes 24, and thence into the cross passage 22 and through the restricted passage 20 into the passage 17. The air passing through the holes 24 is at slightly less than atmospheric pressure, and draws fuel through the holes 40 and 41 into the holes 24 where such fuel is picked up in atomized form by the passing air and carried along through the cross passage 22 and the passage 20 into the passageway 17. The intimacy of mixture of the fuel and air is increased as the stream of mixed air and fuel changes its direction on entering the cross passage 22 and again on entering the restricted passage 20. The stream of mixed air and fuel increases in velocity while passing through the restricted passage 20, and after leaving such restricted passage is drawn upward through the passage 17 past the group or groups of holes 16, and encounters the streams of air from the holes 16 at and near the points of collision of such streams, so that the turbulence due to such collision breaks up the particles of fuel still more finely and mixes them intimately and uniformly with the air. This intimate mixture of fuel and air is carried from the passage 17 to the engine. As already explained, any fuel which may condense on the sides of the passage 17 is carried off the shoulder 18 into the colliding streams of air from the holes 16, and thus a film of fuel passing up the side of the passageway 17 is avoided. Because of the restricted size of the passageway 20, and the relatively small variation in the speed of discharge of a gas through a restricted aperture for quite wide variation in the pressure producing such discharge, after a certain speed of discharge is exceeded, the variation in the vacuum in the holes 24 and cross passage 22 is very slight, and the vacuum is very low, although the variations in the vacuum in the passageway 17 are very great. Thus, for instance, for a variation in vacuum of from one inch to over twenty inches of mercury in the passage 17, which is a variation actually measured, there is a variation in the vacuum in the holes 24 of from three-sixteenths to three-eighths of an inch of mercury. The vacuum in the holes 24 is thus very nearly constant, and as a result the velocity of the air through such holes varies but slightly. As this vacuum is low, the holes 40 and 41 may be of substantial size—about an eighth of an inch in diameter in the carbureter shown—so that the disturbing effects of capillary action in the fuel passage are avoided, and the rate of linear flow of fuel through the fuel passages 40 and 41 is very low and subject to but small variations in comparison to those present when a smaller fuel passage is used, which results in minimizing changes in the composition of the mixture due to the inertia of the fuel in the fuel supply passage. By operating the lever 13, the sizes of the air and fuel inlet passages are varied correspondingly, always being similar in shape as heretofore explained.

In order to make the vacuum in the holes 24 even more nearly constant, I provide blocks 55 in the annular passageway 25 for gradually diminishing the effective size of the lower ends of the holes 24 as the member 12 is moved to bring the holes 40 and 16 more fully into registry with the holes 41 and 15 respectively. Because of this restriction to the entrance of the holes 24, the difference between the vacuum in such holes and in the passageway 17 as the member 12 is turned to open or close the air and fuel inlet passages is made less than it would otherwise be, and by properly shaping the blocks 55 the vacuum in the holes 24 may be made practically as nearly constant as desired.

Instead of placing the blocks at the bottoms of the holes 24, I may place them at the bottoms of supplementary holes 60 which parallel the holes 24 and at their bottoms open into the annular passage 25 and at their tops into a supplementary cross passage 61 which intersects the cross passage 22 just below the restricted passage 20. In this construction the total supply of initial air is divided into two parts, one of which is through the holes 24 and past the fuel inlet openings 40 and the other of which is through the holes 60, into which no fuel inlet holes open. In consequence, the movement of the member 12 to increase the main air and fuel inlet openings 15—16 and 40—41 decreases the size of the inlet ends of the holes 60 and thus raises the vacuum in the cross passages 61 and 22 from what it would otherwise be and so raises the vacuum in the holes 24 slightly without diminishing the area of the inlet ends of such holes, so that the vacuum and velocity in the air of the holes 24 past the fuel inlet supply passages is maintained substantially constant. This action, like those of the other arrangements described, primarily depends for its constancy of vacuum in the holes 24 on the relatively small size of the passage 20 as compared to the combined cross sectional areas of the passages 24 and 60. The relations between the sizes of these passages may be controlled by the adjusting screws 21 and 23, and also by adjusting screws 62 which project into the holes 24 opposite the holes 40.

For idling purposes, each hole 41 may be provided with a groove 63 along that side toward which the hole 40 moves when closing the fuel inlet, so that when the hole 41 is completely out of registry with the hole 40 and the holes 16 completely out of registry with the holes 15 the groove 63 is still in registry with the hole 40 and permits the passage of sufficient fuel for the carbureting of the air passing through the passage 20, as when idling of the engine. The groove 63 thus provides for enriching the mixture when the demand on the engine is very low, to compensate for the initial air and for inward air leakages due to the high vacuum then existing; and is used when such enriching is desired.

Similarly, a leaner mixture is sometimes desired for normal running on smooth roads, and for this purpose small supplementary air holes 65 may be provided in the rotatable member 12 near the air inlet holes 16 so as to be uncovered by the holes 15 shortly after the beginning of the uncovering of the holes 16. These provide a slight additional amount of air, so as to promote economy; but as the holes 16 are progressively uncovered by the holes 15 the effect of the holes 65 is proportionally diminished and eventually becomes negligible, so that for wide openings of the holes 15—16 a rather richer mixture may be producd, to give an increase of power, than for smaller openings of such holes. The proportionate amount by which the mixture is made leaner by the holes 65 may be determined by the number, size, and location of such holes relatively to the holes 16.

Thus by the use of the groove 63 and of the holes 65, it is possible to vary as desired from exact uniformity the proportions of the air and fuel in the mixture for different openings of the carbureter, when such variations are desired. For instance, the groove 63 provides for a larger proportion of fuel, for idling and to compensate for the initial air and for any inward air leakages due to the high vacuum which exists during idling; the holes 65 provide for a lean mixture during running at ordinary speeds on smooth roads, thus promoting economy; and the main air and fuel supply holes provide for a rather richer mixture when such holes are wide open, to give power when power is required, as for hill climbing.

I claim as my invention:

1. The process of carbureting air, which consists in maintaining a vacuum within a chamber, admitting air to be carbureted into such chamber through a hole of variable size, admitting a mixed stream of air and fuel from a supplemental passageway through a restricted passage into said chamber, admitting both fuel and air into said supplemental passage through holes of variable size, and varying the sizes of the first-named air inlet hole and the fuel inlet hole proportionately.

2. The process of carbureting air, which consists in maintaining a vacuum within a chamber, admitting air to be carbureted into such chamber through a hole of variable size, admitting a mixed stream of air and fuel from a supplemental passageway through a restricted passage into said chamber, and admitting both fuel and air into said supplemental passage through holes of variable size.

3. The process of carbureting air, which consists in maintaining a vacuum within a chamber, admitting air to be carbureted into such chamber through a hole of variable size, admitting a mixed stream of air and fuel from a supplemental passageway through a restricted passage into said chamber, admitting both fuel and air into said supplemental passage through holes of variable size, and varying the sizes of the first-named air inlet hole and the fuel inlet hole proportionately and the size of the second-named air inlet hole inversely.

4. The process of carbureting air, which consists in maintaining a partial vacuum in a chamber, admitting air directly to such chamber, varying the amount of such air to vary the vacuum in such chamber inversely as the amount of air through a wide range, admitting fuel and a relatively small quantity of air into a supplemental chamber having a contracted connection with the first chamber so that the vacuum in the second chamber varies through a relatively very small range as compared with that in the first chamber, and varying the size of the fuel admission opening to said second chamber substantially in proportion to that of the air inlet opening to the first chamber.

5. The process of carbureting air, which consists in maintaining a partial vacuum in a chamber, admitting air directly to such chamber, varying the amount of such air to vary the vacuum in such chamber inversely as the amount of air through a wide range, admitting fuel and a relatively small quantity of air into a supplemental chamber having a contracted connection with the first chamber so that the vacuum in the second chamber varies through a relatively very small range as compared with that in the first chamber, and varying the size of the admission opening for the small quantity of air for the second chamber in inverse sense to the size of the air admission opening to the first chamber, so that the vacuum in the second chamber is maintained still more nearly constant.

6. The process of carbureting air, which consists in maintaining a partial vacuum in a chamber, admitting air directly to such chamber, varying the amount of such air to vary the vacuum in such chamber inversely as the amount of air through a wide range, admitting fuel and a relatively small quantity of air into a supplemental chamber having a contracted connection with the first chamber so that the vacuum in the second chamber varies through a relatively very small range as compared with that in the first chamber, varying the size of the fuel admission opening to said second chamber substantially in proportion to that of the air inlet opening to the first chamber, and varying the size of the admission opening for the small quantity of air for the second chamber in inverse sense to the size of the air admission opening to the first chamber, so that the vacuum in the second chamber is maintained still more nearly constant.

7. The process of carbureting air, which consists in admitting air through openings into a chamber in streams which collide within the chamber, discharging liquid fuel through an opening into the opposed streams of air at their point of collision, and varying substantially proportionately the sizes of the air-admitting openings and the fuel-admitting opening.

8. The process of carbureting air, which consists in admitting air through openings into a chamber in streams which collide within the chamber, discharging a stream composed of liquid fuel in atomized form and a relatively small quantity of air into the opposed streams of air at their point of collision, and varying substantially proportionately the sizes of the air-admitting opening and the opening for supplying the liquid fuel.

9. The process of carbureting air, which consists in admitting air through openings into a chamber in streams which collide within the chamber, discharging a stream composed of liquid fuel and a relatively small quantity of air into the opposed streams of air at their point of collision, and varying substantially proportionately the sizes of the air-admitting opening and the opening for supplying the liquid fuel.

10. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion than in the first chamber as the quantity of air admitted to the first chamber increases, and maintaining the openings for admitting fuel and air of substantially proportional size.

11. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion than in the first chamber as the quantity of air admitted to the first chamber increases.

12. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion as the quantity of air admitted to the first chamber increases, maintaining the openings for admitting fuel and air of substantially proportional size, and admitting air into and supplementary chamber through openings which vary in inverse sense as the openings for admitting the first-named air and fuel.

13. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion as the quantity of air admitted to the first chamber increases, and admitting air into said supplementary chamber through openings which vary in inverse sense as the openings for admitting the first-named air and fuel.

14. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion as the quantity of air admitted to the first chamber increases, maintaining the openings for admitting fuel and air of substantially proportional size; and admitting air into said supplementary chamber.

15. The process of carbureting air, which consists in measuring air into a chamber in which the vacuum decreases as the quantity of air increases, and measuring fuel into a supplementary chamber which is connected with the first chamber through a restricted passageway and in which the vacuum decreases in much smaller proportion as the quantity of air admitted to the first chamber increases, and admitting air into said supplementary chamber.

16. The process of carbureting air, which comprises admitting air in varying amounts into a chamber in which the vacuum varies through a wide range in inverse sense to the amount of air admitted, and admitting fuel through an opening of more than capillary size into a chamber which is connected by a restricted passageway to the first chamber and in which the vacuum is much lower and much more nearly constant than in the first chamber.

In witness whereof, I have hereunto set my hand at Indianapolis, Indiana, this twenty-second day of November, A. D. one thousand nine hundred and fifteen.

TURNER D. BOTTOME.